United States Patent
Hiltunen

(10) Patent No.: US 7,496,350 B2
(45) Date of Patent: Feb. 24, 2009

(54) ELECTRONIC PERSONAL DEVICE

(75) Inventor: Miska Hiltunen, Witten (DE)

(73) Assignee: Nokia Corporation, Espoo (FI)

(*) Notice: Subject to any disclaimer, the term of this patent is extended or adjusted under 35 U.S.C. 154(b) by 298 days.

(21) Appl. No.: 10/519,816

(22) PCT Filed: Jul. 2, 2002

(86) PCT No.: PCT/IB02/02598

§ 371 (c)(1),
(2), (4) Date: Aug. 29, 2005

(87) PCT Pub. No.: WO2004/006542

PCT Pub. Date: Jan. 15, 2004

(65) Prior Publication Data

US 2006/0077903 A1    Apr. 13, 2006

(51) Int. Cl.
*H04J 1/16* (2006.01)
(52) U.S. Cl. .................. 455/411; 370/252
(58) Field of Classification Search .......... 455/561, 455/410, 411; 705/64; 713/182, 186; 370/252, 370/352
See application file for complete search history.

(56) References Cited

U.S. PATENT DOCUMENTS 5,995,014 A * 11/1999 DiMaria .......... 340/5.52
2003/0097571 A1* 5/2003 Hamilton et al. ........ 713/182
2005/0120866 A1* 6/2005 Brinkman et al. ........ 84/609

FOREIGN PATENT DOCUMENTS

| DE | 19911416 | 11/2000 |
|---|---|---|
| WO | WO 0141458 | 6/2001 |
| WO | WO 0235870 | 5/2002 |

* cited by examiner

*Primary Examiner*—Sam Bhattacharya
(74) *Attorney, Agent, or Firm*—Alfred A. Fressola; Ware, Fressola, Van Der Sluys & Adolphson LLP

(57) ABSTRACT

The present invention relates to an electronic personal device comprising: a central processing unit (10), interface means for providing access to a memory area (11) for storing personal information data of the owner of the electronic device, a user interface (13) having at least input means (14) for inputting operating commands, and output means (15) for outputting information data, locking means (17) for locking the electronic device to prevent unauthorized use thereof if activated. To enable any third person to operate the electronic personal device without any authorization but only in a limited manner to retrieve personal information about the owner of the device easily, retrieving means (18) are provided for operating the electronic device to retrieve the personal information data stored in the memory area (11), even if the locking means (17) are activated.

19 Claims, 3 Drawing Sheets

ELECTRONIC PERSONAL DEVICE

CROSS REFERENCE TO RELATED APPLICATIONS

This application is for entry into the U.S. national phase under §371 for International Application No. PCT/IB02/02598 having an international filing date of Jul. 2, 2002, and from which priority is claimed under all applicable sections of Title 35 of the United States Code including, but not limited to, Sections 120, 363 and 365(c).

TECHNICAL FIELD

The present invention relates to an electronic personal device, in particular to a personal device that can be used as a personal electronic SOS-card suitable for retrieving personal information of the owner of this card that may be needed by rescue personnel in case of an accident or a medical emergency.

BACKGROUND OF THE INVENTION

To ensure that a person who has an accident or a medical emergency will be treated in a proper way, so called SOS-cards in paper form are recommended to be carried around by people. Such SOS-cards usually include information about its owner including name, address, phone number, closest relative or other contact person as well as his/her phone number(s), information about chronic illnesses, medication, medicine and other allergies, vaccinations, organ donation together with a personal signature, a photo and/or other special features of the owner for identification purposes. If a person who is injured by an accident carries such a personal SOS-card, he/she can be treated by the rescue personnel who treats him/her first in a proper way taking into account the person's allergies, chronic illnesses or the like, but only if the rescue personnel finds the SOS-card with the corresponding information prior to treating.

Therefore, it is in general possible to increase safety of people in emergency situations by such an SOS-card. However, many people do not carry around such a paper SOS-card. Further, it is often difficult for first-aid attendants to find such a paper SOS-card even if the person to be treated carries such card since there are a lot of possible places to deposit such small and flat card in the pockets of the cloth.

Electronic personal devices, like handheld computers, smart cards and in particular mobile phones become more and more popular to be carried around by people. Further, the use of smart cards as keys or identification means for entering certain premises are spread out widely.

Thus, it seems to be possible to integrate an SOS-card function into a personal electronic device, in particular into a mobile phone that is almost always carried around by its owner.

However, access to information stored in the mobile phone is only possible when the mobile phone Is switched on. Therefore, if the mobile phone is switched off by the owner, e.g. to safe energy, SOS-card data stored therein is not available for third people because an authorization code, e.g. a personal identification number (PIN), has to be entered to complete switching on and to get full access to all operating modes.

However, it is already known that a mobile phone can be used without entering a PIN code for emergency calls either by dialing an emergency number or by pushing a specific emergency call button.

Furthermore, a known handheld computer (e.g. Palm V™-Organizer of 3Com Corporation) includes a telephone book function for storing information as data sets having a kind of business card format. One of these data sets, for example a data set including all business card information of the owner of the handheld computer can be selected by a specific menu item to be transmitted to another handheld computer via an IR interface. Even in case that the handheld computer is switched off, actuating a specific button causes the computer to transmit this selected specific data set.

However, in case that the handheld computer is switched off using a locking function for safety and data protection purposes it is not possible to switch on the computer or to retrieve any data therefrom without entering an authorization code like a password.

SUMMARY OF THE INVENTION

Therefore, it is an object of the present invention to provide an electronic personal device that can be operated by any third people without any authorization but only to retrieve personal information about the owner of the device easily.

According to the present invention an electronic personal device that comprises a central processing unit, interface means for providing access to a memory area for storing personal information data of the owner of the electronic device, a user interface having at least input means for inputting operating commands and output means for outputting information data as well as locking means for locking the electronic device to prevent unauthorized use thereof if activated, is provided with retrieving means for operating the electronic device to retrieve the personal information data stored in the memory area even if the locking means are activated. Thus, the present invention provides an electronic SOS-card for storing a plurality of personal information including name, address, phone numbers, contact persons, personal medical information, and personal identification information, like a photo and/or special identification features including age, sex, hair color, eye color, tattoos and any other distinctive features.

Therefore, it is possible for a third person, e.g. a first-aid attendant or ambulance person to get information about the owner of the electronic personal device by retrieving information data from the device in case that the owner is disabled to help her/himself due to an accident or a medical emergency.

A first embodiment of the present invention is characterized by memory means connected with the central processing unit for providing the memory area for storing personal information data of the owner of the electronic device.

In case that an electronic personal device according to the present invention is provided with a SIM card, it is of advantage if the memory means provided on the SIM card are used as the memory area for storing personal information data of the owner of the electronic device. In this case it is possible that the owner of the SIM card can change over from using one electronic device to another that can be used with the same SIM card without the necessity of inputting the personal information again when using the new device with his/her SIM card.

Another development of the present invention is characterized by an air interface for connecting the central processing unit with the memory area for storing personal information data of the owner of the electronic device, the memory area is provided by remote memory means located at a server of a service provider, wherein the air interface comprises an RF module for use in telecommunications network.

In this case it is possible to store some or all personal information in remote memory means located at a server of a service provider so that these personal information can be updated easily by any authorized person, e.g. by the family doctor or any other physician authorized in case medical information has changed. However, in both of these cases some very important medical information data should be stored in a memory area of the device to ensure quick access to this information without thinking about the reliability of the connection and even in case that the coverage of a telecommunications network is missing.

To ensure that personal information can be retrieved easily it is of advantage if the input means comprises a specific button for activating the retrieving means for obtaining the personal information data of the owner from the memory area.

However, in case that the inventive electronic personal device is a mobile phone having a keypad for dialing a phone number, the retrieving means comprises a comparator means for comparing a character sequence input with a retrieving code and access means for retrieving personal information data from the memory area.

In this case a standard character sequence like S O S or 7 6 7, that is known by everyone, can be used for retrieving personal information data.

According to another refinement of the present invention it is provided that the retrieving means comprises a menu control means for selecting a menu item for obtaining the personal information data of the owner from the memory area.

BRIEF DESCRIPTION OF THE DRAWINGS

The invention will be explained in more detail here in after by way of example with reference to the accompanying drawings.

Mutually corresponding components are provided with the same reference symbols in the various figures of the drawings.

DETAILED DESCRIPTION OF THE PREFERRED EMBODIMENTS

Figure 1:
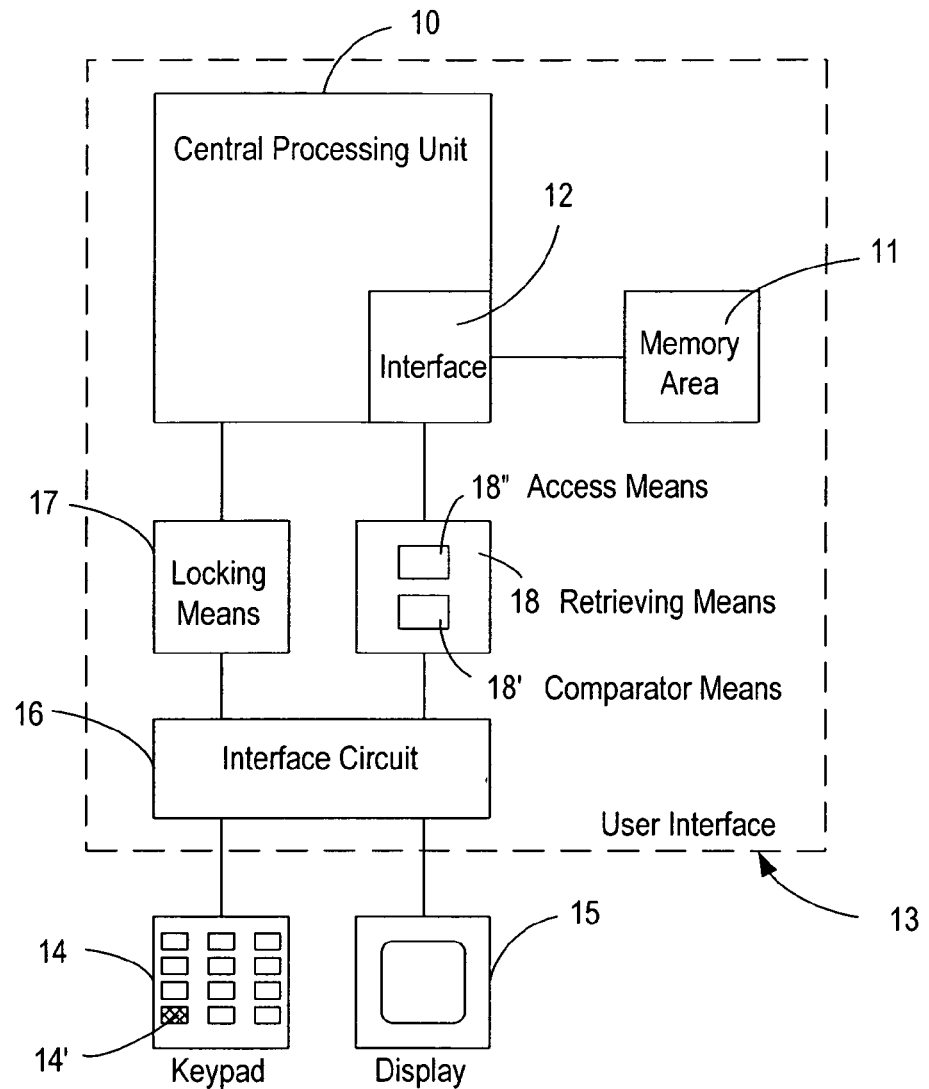
FIG. 1 shows a schematic simplified block diagram of an electronic personal device according to the present invention.

According to FIG. 1 an electronic personal device like a mobile phone or a handheld computer, comprises a central processing unit CPU 10 being connected to a memory area 11 via an interface 12. The interface 12 can be any suitable interface used for data transfer between the central processing unit 10 and the memory area 11.

For inputting any kind of information, in particular information data and operating data, a user interface 13 comprises input means that can be formed by a keypad 14 as usually provided for mobile phones, a turn-push-button1 a jog-dial, a touchscreen or the like. Further, the input means can be also provided with a voice command input. For outputting information data the user interface 13 comprises output means formed by a display 15. In addition, a loudspeaker can be used for announcing information. Both the input and the output means 14, 15 are connected via an interface circuit 16 to the central processing unit 10.

To prevent unauthorized use of the mobile device1 locking means 17 are provided so as to allow or disallow entering operating commands into the central processing unit 10 for operating the electronic device. The locking means 17 can be formed by a security routine that prompts the user for a password after switching on and which enables operating the device only if the password entered by the user is correct. For mobile phones, the personal identity number PIN related with the SIM card is used as such password. For handheld computers, usually the password can be selected by the user during operating a corresponding security function.

Further, to enable retrieving specific personal information data stored in the memory area 11, in case of an accident or a medical emergency retrieving means 18 are provided in addition to the locking means so as to allow a very limited access to the memory 11 via the central processing unit 10 even if general operating of the electronic device is disallowed by the locking means 17, e.g. the retrieving means 18 comprises a comparator means 18' for comparing a character sequence input via the keypad 14 with a retrieving code and access means 18" for retrieving personal information data of the owner from the memory area.

Although the interface circuit 16, the locking means 17 and the retrieving means 18 are shown as separate circuit elements, these elements can be provided together with the central processing unit 10 as elements of a common microprocessor. Further, the locking means 17 as well as the retrieving means 18 can be implemented as software programs or parts thereof.

As indicated in FIG. 1 the memory area is provided by a memory means 11 that is a part of the electronic device.

According to the present invention the electronic device described in connection with FIG. 1 can be used as electronic SOS-card having personal information data of the owner of the electronic device stored within the memory means 11, in particular within a certain area thereof that is indicated as storing personal SOS-data of the owner.

This personal information can contain but is not limited to the owner's name, address, phone number(s), closest relative or other contact persons together with his/her phone number (s), as well as specific medical information as about chronic illnesses, medication, medicine and other allergies as well as vaccinations. Further, in case that the electronic device provides the possibility to confirm the correctness of a stored information by means of an electronic signature that is legally accepted, it is also possible to include information about organ donation.

Further, for identification purposes a photo and/or information about age, sex, hair color, eye color, tattoos and any other distinctive features other special features of the device owner can be stored. Thus it is easy for rescue personnel to identify a person as the owner of the device.

The format of the presentation should be clear regardless of the country or a language area of the device.

The electronic personal device according to the invention increases safety of people in emergency situations. In particular, if the owner of the electronic device is injured by an accident, the people who have to provide medical treatment as first aid can inform him/herself about necessary medical data and about personal information data for informing relatives of the victim of the accident.

In case that a child is lost, a person who found it, for example a police officer, can easily retrieve the name and the address of the child including the phone number of his/her parents from a mobile phone that is carried around by the child.

For retrieving the personal SOS-card data, a specific button can be provided for activating the retrieving means 18. This specific button can be an additional button, but it can be also a selected key 14' of a keypad 14 that is marked accordingly to be easily identified as SOS-card data retrieving button or key.

Furthermore, for activating the operation for retrieving SOS data it is possible to use a specific retrieving code that can be Input by the keypad 14 without any additional modifications of the keypad 14 as such. For example, in case that the electronic device is a mobile phone it can be provided that the specific retrieving code is 7 6 7 that is correlated with S O S.

Furthermore, it is also possible that the SOS-card data retrieving function is implemented as a menu item that can be easily found by scrolling through the menu items.

In case of an electronic device that can be operated only after inputting a password or PIN, it is necessary to provide a menu access for selecting the SOS-card data retrieving function. Therefore, it is possible to present all menu items to the user during scrolling even if a PIN or the like has not been entered but allow only the SOS-card data retrieving function. Another possibility is that only the available SOS-card data retrieving function is displayed to the user when she/he requests access to the menu.

Figure 2:
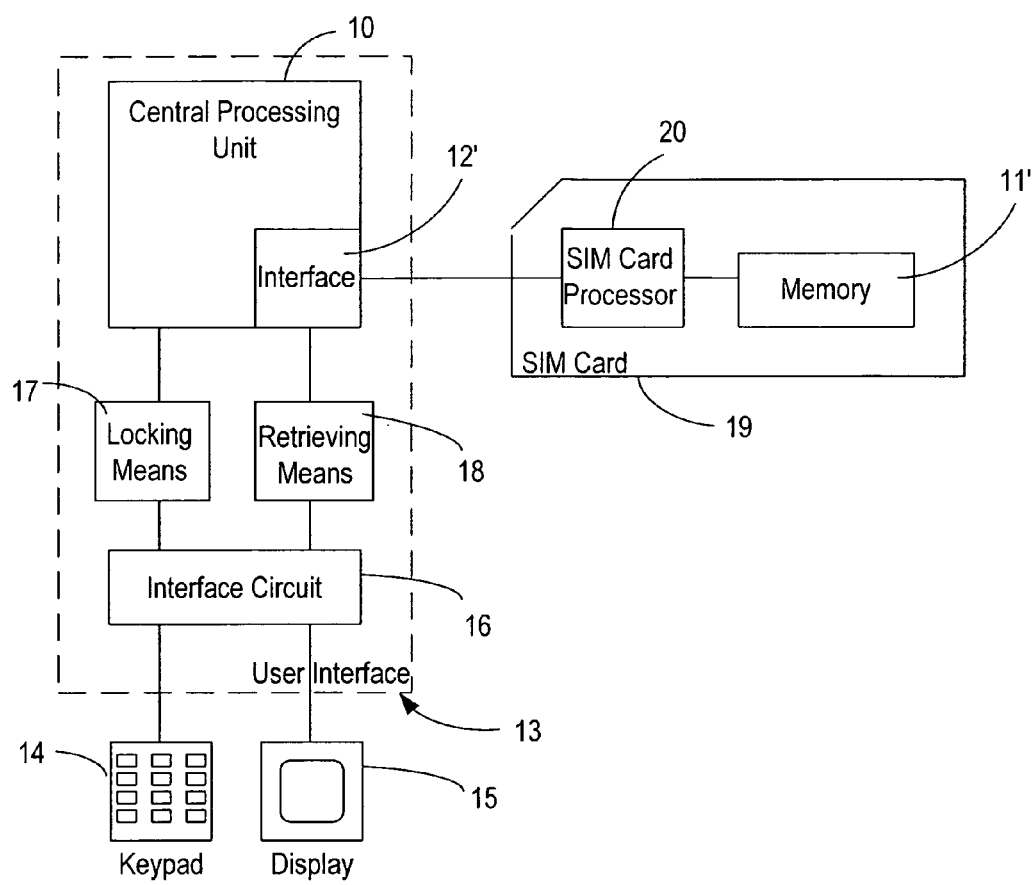
FIG. 2 shows a schematic simplified block diagram of another electronic personal device according to the present invention.

According to the embodiment of FIG. 2 that shows an electronic device that is provided with a specific slot for inserting a user or subscriber identification module, a memory means 11' provided on the user or subscriber identification module or SIM card can be used as memory area for storing personal information data of the owner of the device. In this case, the memory means 11' is connectable to the central processing unit 10 via the SIM card processor 20 and a corresponding interface 12' including SIM contacts (not shown). Storing the personal information or SOS-card data in the SIM card memory makes it possible that the owner of a SIM card does not need to input her/his personal SOS-card data as mentioned above every time he changes the mobile device without changing her/his SIM card.

Figure 3:
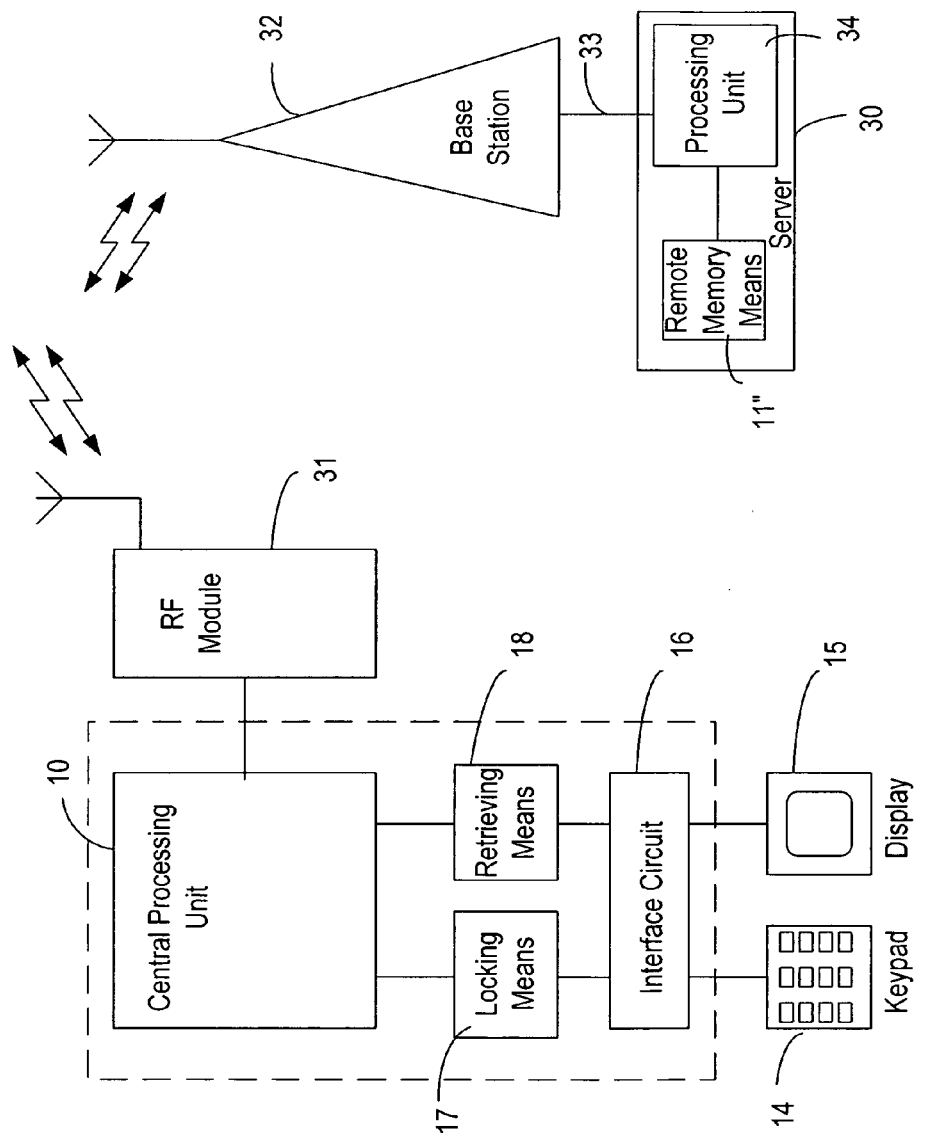
FIG. 3 shows a schematic simplified block diagram of a third embodiment of the present invention.

According to another embodiment it is also possible that the memory area for storing personal information data is provided by remote memory means 11" located at a server 30 of a service provider. In this case interface means for connecting the central processing unit 10 of the electronic device, in particular of a mobile phone includes an RF module 31 for use in a telecommunications network, a base station 32 of such a network, suitable connecting means 33 for connecting a base station 32 of a telecommunications network to the server 30 and a processing unit 34 of the server 30. The connecting means 33 for connecting the base stations 32 to a server 30 that is indicated in FIG. 3 by a simple line includes all necessary communication means like Internet, public switched telephone network and so on.

In case that personal SOS-card data are remotely stored in a memory means 11" of a server 30, it is possible to store all personal SOS-card data in the remote memory means 11". However, it is preferred to store some of the SOS-card data in the electronic device either in a SIM card memory 11' or in a device memory 11 as discussed above whereas other or even all SOS-card data are remotely stored in the memory means 11" of the server 30. In this case, personal SOS-card data stored in memory means of the device are urgent information like blood type, allergy information and so on that is needed by an ambulance person for properly treating the victim of an accident or a medical emergency. Therefore, a mobile phone can be used in this way as an electronic SOS-card without worrying about the reliability of the RF connection or the coverage area of the telecommunications network.

Personal information data stored remotely can be automatically updated without access to the electronic device as such. Therefore, information about medication and vaccinations which may change after visiting a physician can be updated by the physician in case that she/he is authorized by the user accordingly. This makes it sure that the personal SOS-card information stored is always up-to-date.

Thus, with the present invention, electronic SOS-card information is more readily maintainable, i.e. changes to the information are easier to make than in a paper SOS-card. Further, awareness of the electronic SOS-card, i.e. of the electronic device, for example a mobile phone or a handheld computer, is better than the paper SOS-card because of its huge and popularity, in particular1 of the mobile phones. Such a mobile phone is easier to find than the person's wallet or a paper SOS-card. Since more and more people own mobile phones but do not have a paper SOS-card, the invention increases the safety of persons in the already mentioned situations because rescue or ambulance people can access and find contact information from the electronic device according to the present invention.

The invention claimed is:

1. An apparatus comprising:
a central processing unit,
a memory for storing at least personal information data of an owner of the apparatus,
an interface operatively connected to said processing unit and said memory for providing access to said memory,
a user interface having at least
an input module for inputting operating commands, and
an output module for outputting information data,
a locking module for locking the apparatus to prevent unauthorized use thereof if activated, and
a retrieving module operatively connected to said input module and said processing unit for operating the apparatus upon receipt of at least one operating command so as to retrieve the personal information data stored in the memory area so that the personal information data can be output via said output module, even if the locking module is activated.

2. The apparatus as claimed in claim 1, wherein memory connected with the central processing unit provides the memory for storing personal information data of the owner of the apparatus.

3. The apparatus as claimed in claim 2, wherein an air interface provides for connecting the central processing unit with the memory for storing personal information data of the owner of the apparatus, and wherein the memory is provided by a remote memory located at a server of a service provider.

4. The apparatus as claimed in claim 1, wherein a subscriber identity module card connected with the central processing unit, and a memory provided on the subscriber identity module card is used as the memory for storing personal information data of the owner of the apparatus.

5. The apparatus as claimed in claim 4, wherein an air interface provides for connecting the central processing unit with the memory for storing personal information data of the owner of the apparatus, and wherein the memory is provided by a remote memory located at a server of a service provider.

6. The apparatus as claimed in claim 5, wherein the air interface comprises a radio frequency module for use in a telecommunications network.

7. The apparatus as claimed in claim 6, wherein the input module comprises a specific button for activating the retrieving module for obtaining the personal information data of the owner from the memory.

8. The apparatus as claimed in claim 6, wherein the input module comprises a keypad for entering a phone number and wherein the retrieving module comprises a comparator for comparing a character sequence input via the keypad with a retrieving code and for causing the retrieving module to retrieve personal information data of the owner from the memory.

9. The apparatus as claimed in claim 6, wherein the retrieving module comprises a menu control for selecting a menu item for obtaining the personal information data of the owner from the memory.

10. The apparatus as claimed in claim 1, wherein an air interface provides for connecting the central processing unit with the memory for storing personal information data of the owner of the apparatus, and wherein the memory is provided by a remote memory located at a server of a service provider.

11. The apparatus as claimed in claim 10, wherein the air interface comprises a radio frequency module for use in a telecommunications network.

12. The apparatus as claimed in claim 1, wherein the input module comprises a specific button for activating the retrieving module for obtaining the personal information data of the owner from the memory.

13. The apparatus as claimed in claim 1, wherein the input module comprises a keypad for entering a phone number and wherein the retrieving module comprises a comparator for comparing a character sequence input via the keypad with a retrieving code and for causing the retrieving module to retrieve personal information data of the owner from the memory.

14. The apparatus as claimed in claim 1, wherein the retrieving module comprises a menu control for selecting a menu item for obtaining the personal information data of the owner from the memory.

15. The apparatus as claimed in claim 1, wherein the personal information data includes at least the name and gender of said owner.

16. The apparatus as claimed in claim 1, wherein the personal information data includes photographic information of the owner of the apparatus.

17. The apparatus as claimed in claim 1, wherein the personal information data includes medical information of the owner of the apparatus.

18. An apparatus comprising:

means for processing, means for storing at least personal information data of an owner of the apparatus, means for providing access to said means for storing, means for inputting operating commands, and means for outputting information data, means for locking the apparatus to prevent unauthorized use thereof if said means for locking is activated, and means for operating the apparatus upon receipt of at least one operating command so as to retrieve the personal information data stored in the means for storing so that the personal information data can be output via said means for outputting information data, even if the means for locking the apparatus is activated.

19. A method comprising:

storing at least personal information data of an owner of an apparatus in a memory, locking the apparatus to prevent unauthorized use thereof if a locking module is activated, and operating the apparatus upon input of at least a specific operating command so as to retrieve and output the personal information data stored in the memory even if the locking module is activated.

* * * * *